UNITED STATES PATENT OFFICE.

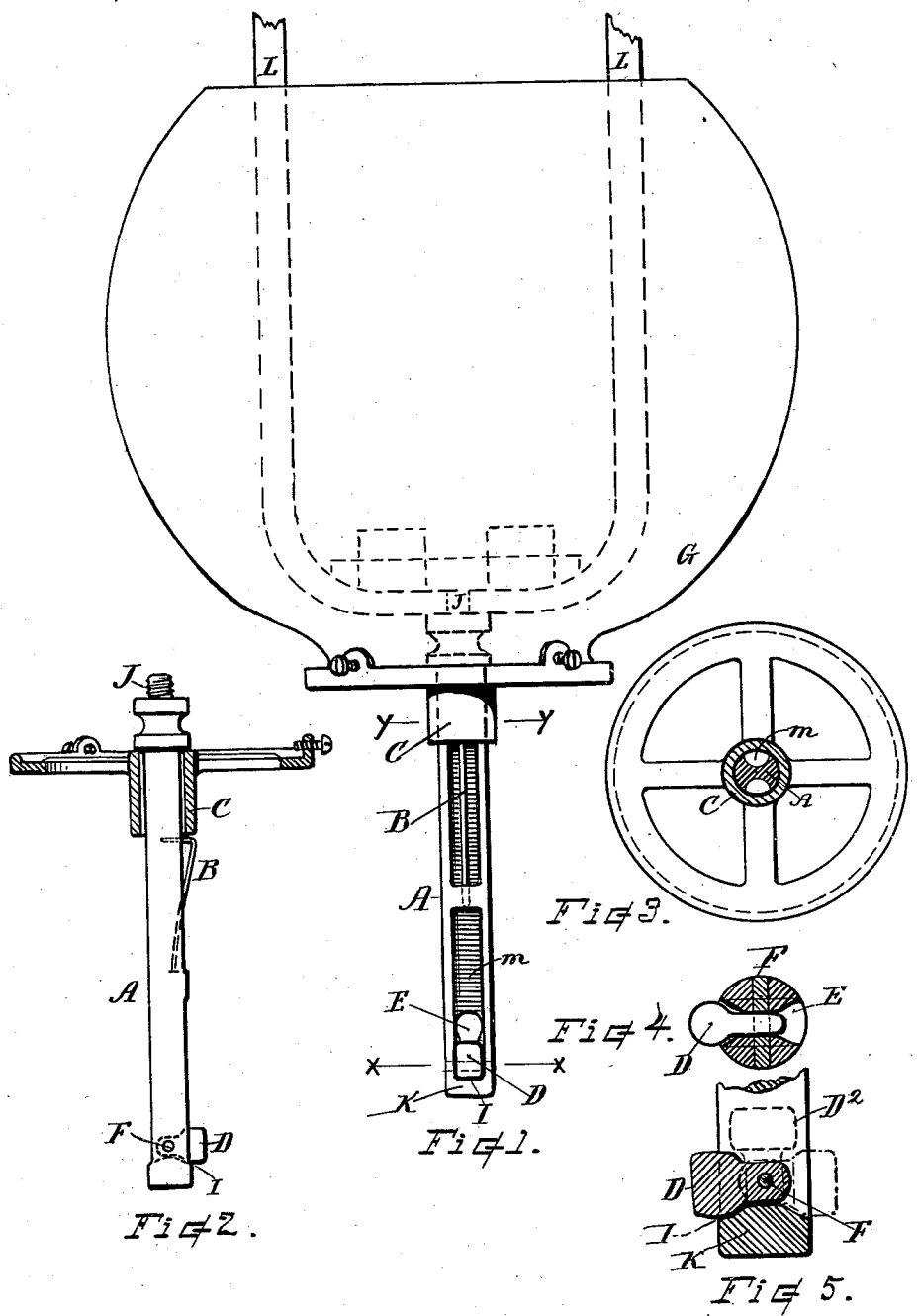

WILLIAM H. COUGHLIN, OF WORCESTER, MASSACHUSETTS, ASSIGNOR TO THE WORCESTER ELECTRIC LIGHT COMPANY, OF SAME PLACE.

ELECTRIC-ARC LAMP.

SPECIFICATION forming part of Letters Patent No. 593,738, dated November 16, 1897.

Application filed April 9, 1897. Serial No. 631,365. (No model.)

*To all whom it may concern:*

Be it known that I, WILLIAM H. COUGHLIN, a citizen of the United States, residing at Worcester, in the county of Worcester and State of Massachusetts, have invented a new and useful Globe-Holder for Electric-Arc Lamps, of which the following, together with the accompanying drawings, is a specification sufficiently full, clear, and exact to enable persons skilled in the art to which this invention appertains to make and use the same.

The object of my present invention is to provide a globe-holder for electric-arc lamps for outdoor uses having its parts constructed and combined, substantially as hereinafter explained, for affording facility for quick and safe manipulation of the globe by the attendant when attending the lamps or when adjusting, removing, or cleaning the globes; also to render the globe-holder convenient for operation and readjustment, efficiently durable, and less liable to accidents by the dropping of the globe. These objects I attain by the globe-holder mechanism shown in the accompanying drawings, wherein—

Figure 1 is a front view; Fig. 2, a side view with the collar in section; Fig. 3, a cross-section at line $y$ $y$, looking up; Fig. 4, a cross-section at line $x$ $x$, and Fig. 5 a vertical section at the lower end of the spindle.

My invention consists in a globe-holding spindle A, provided with a latch-spring B, secured in and projecting from its side, as shown, and adapted for retaining the collar C and globe G at elevated position. The spring B is compressible into the spindle by suitably-applied force for permitting the collar to slide over the spring for the convenient lowering and raising of the globe. The lower end of the spindle has an opening E therethrough, within which is arranged a horizontally-pivoted dog or stop D, the head of which can swing through or into the opening, and when at normal position projects beyond the cylindrical surface of the spindle at one side or the other and forms a stop that prevents the collar and globe from sliding off the end of the spindle; but said dog D can be turned upward upon its pivot-pin F to temporarily occupy a position within the opening E, as indicated by dotted lines $D^2$ on Fig. 5, and the collar and globe can then be removed from the spindle. The dog immediately falls to horizontal position when left to its own volition, and being permanently attached to the spindle by its pivot there is no liability of its becoming displaced, dropped to the ground, or lost in the manipulation and attendance on the lamp. The lower end of the spindle is formed solid at K, and the adjacent surfaces of the dog-head and spindle at I are formed to match and to afford a solid seat for the support of the dog when the globe is lowered and its collar C rests thereon. The top end of this spindle is formed with the usual screw-threaded tip J for attaching it to the frame L of the lamp. The sides of the spindle may be recessed, as at $m$, for lightness of structure. The collar C is of common form, except that the usual set-screw is omitted therein.

When placing the collar and globe on the spindle, no attention need be paid to the securement of the same, as the dog B gets out of the way before the collar and falls back into normal position when the collar has passed it. The spring B yields and permits the collar to slide upward over it, but springs outward for retaining the collar and globe the instant they reach their normal elevated position.

With the globe lowered and the collar resting on the dog D the globe can be revolved, as for cleaning, without liability of its sudden escape by unscrewing, as sometimes occurs with the screw-tipped center spindles heretofore employed.

With this improved holder the operation of lowering and readjusting the globe when changing the carbons of the lamp is much simpler, quicker, and easier for the attendant, and he is subject to no liability of dropping and losing some small detachable part.

What I claim, and desire to secure by Letters Patent, is—

1. In a globe-holder, the spindle having an opening therethrough with a solid-metal bearing-seat at the bottom of the opening; in combination with the swinging dog arranged in said opening, and having one end horizontally pivoted near the lower part thereof, its head or free end adapted to normally fall outward and project laterally from one side of the spindle, with the side of the dog supported upon said solid bearing-seat, said dog adapted to be turned upward within the opening to permit the globe-supporting collar to pass onto or from said spindle; said parts arranged and operating substantially as shown and described.

2. The combination with the frame, the globe, and globe-supporting collar in an electric-arc lamp; of the globe-holder spindle provided with a spring-latch that retains said globe and collar at elevated positions, and the pivoted laterally-projecting dog that sustains the said globe and collar when at lowered position, said dog arranged as described in an opening formed through the spindle, and its head adapted to seat upon the solid metal at the bottom of said opening, when standing at normal position, all substantially as set forth.

Witness my hand this 7th day of April, 1897.

WILLIAM H. COUGHLIN.

Witnesses:
CHAS. H. BURLEIGH,
CHAS. LE M. BURLEIGH.